I. SHOENBERG.
FREQUENCY MULTIPLIER.
APPLICATION FILED OCT. 7, 1916.
1,372,202.
Patented Mar. 22, 1921.
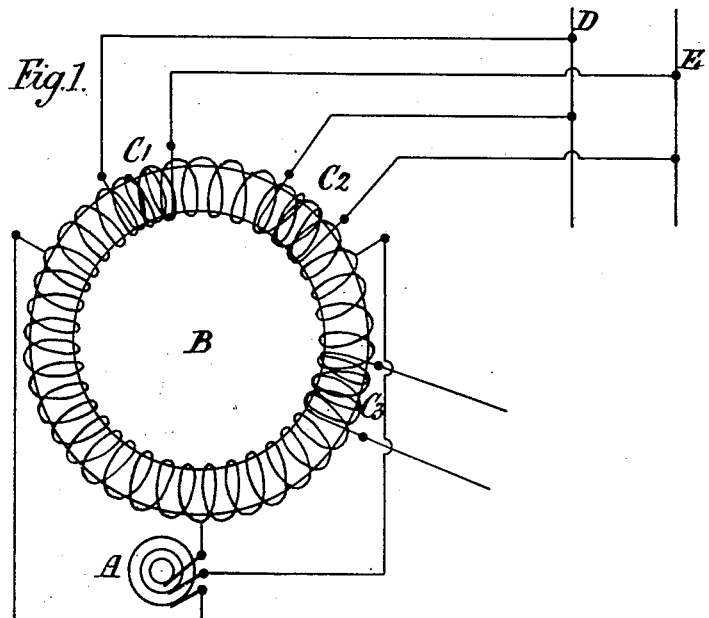
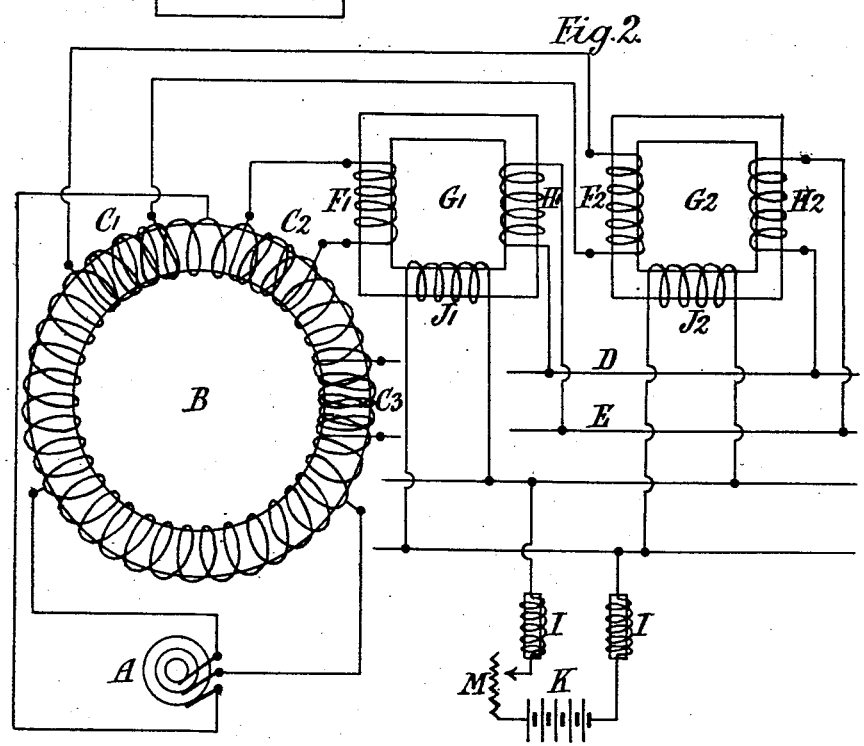

UNITED STATES PATENT OFFICE.

ISAAC SHOENBERG, OF LONDON, ENGLAND, ASSIGNOR, BY MESNE ASSIGNMENTS, TO RADIO CORPORATION OF AMERICA, A CORPORATION OF DELAWARE.

FREQUENCY-MULTIPLIER.

1,372,202.      Specification of Letters Patent.      Patented Mar. 22, 1921.

Application filed October 7, 1916. Serial No. 124,251.

*To all whom it may concern:*

Be it known that I, ISAAC SHOENBERG, a subject of the Czar of Russia, residing at Marconi House, Strand, London, England, have invented new and useful Improvements in Frequency-Multipliers, of which the following is a specification.

This invention relates to improvements in frequency multipliers for alternating electric currents whereby the frequency may be multiplied any desired number of times by means of a single apparatus having no moving parts.

It is well known that if a transformer be so designed that the magnetization of the iron core is carried beyond the "knee" of the curve, a deformed secondary current may be produced having pronounced harmonics.

According to this invention I produce a rotating magnetic field in the closed core of such a transformer and employ a number of secondary coils around the core and connected in parallel. Owing to the rotation of the magnetic field and the spacing of the secondary coils around the core there is a difference of phase between the deformed currents induced in the secondary coils and these currents are added together owing to the coils being connected in parallel. The coils should be so spaced that there may be equal phase difference between them and the result will be, as may be proved mathematically, that only the $n$th harmonic survives in the external circuit, if the number of coils be $n$.

The degree of saturation should be such that the predominant harmonic which appears in the distorted curve should correspond to the number of the secondary coils. Instead of winding the secondary coils upon the saturated core, we may take a deformed polyphase current from it to a second non-saturated core upon which the secondary coils are wound, or we may lead the polyphase current to the primary coils of a transformer or transformers having a saturated core or cores.

It is clear that the invention can be carried out in various ways. The accompanying diagrams show two ways.

In Fig. I A is a three-phase generator which is connected to the terminals of the primary winding of a transformer B which is so designed that the magnetization is carried beyond the knee of the curve. $C^1$, $C^2$ ... $C^n$ are secondary coils which are spaced around the core in such a way that the difference of phase between the currents in any two consecutive coils is constant and are connected in parallel to leads D, E. Transformers may if desired be inserted between A and B. In Fig. 2 A is a three-phase generator which is connected to the terminals of the primary winding of a transformer B having secondaries $C^1$, $C^2$ ... $C^n$. These coils are connected to the primaries $F^1$, $F^2$ of $n$ transformers $G^1$, $G^2$. The secondaries $H^1$ $H^2$ of these transformers are connected in parallel to leads D, E, and the transformers are provided with third windings $J^1$, $J^2$ which are energized from a source K of direct current through large choking coils I, I, and a resistance M. From the common leads D, E a current can be taken the frequency of which will be the $n$th multiple of the fundamental frequency as determined by the generator A.

The change of frequency is effected in the following way:— The cores of the transformers $G^1$, etc., are saturated by means of the source K so as to be above the knee of the magnetization curve. The degree of saturation will have to be chosen (up to a certain extent) in accordance with the number of coils as well as with the phase difference on the common terminals of the coils $C^1$, etc. Owing to this saturation the currents in coils $H^1$, etc., get distorted or in other words are made to possess even harmonics. Since all these coils are connected in parallel, all harmonics will be destroyed except the one of which the order is given by the number of coils. The specific apparatus of Fig. 2 and the method of multiplying frequency herein described in connection with Fig. 2 are not claimed in this application, but are described and claimed in my copending application, Serial No. 276564.

When odd multiples are desired no special windings J for direct current are required, the distortion in this case is effected by a suitable choice of the strength of the alternating current, and of course there must be an odd number of secondary coils $H^1$, etc.

Instead of using several transformers $G^1$, etc., one may be used.

What I claim is:—

1. A system for multiplying frequency, comprising in combination a stationary saturated closed magnetic core having a multiphase primary winding thereon capable when excited of producing a rotating field in said core, and a plurality of angularly spaced secondary coils on said core connected in parallel.

2. A system for multiplying frequency, comprising in combination a primary source of polyphase current, a saturated closed magnetic core having a polyphase winding thereon connected to said source, and a plurality of angularly spaced secondary coils on said core, said secondary coils being connected in parallel.

3. A system for multiplying frequency comprising, in combination, a stationary saturated closed magnetic core having a multiphase primary winding thereon capable when excited of producing a rotating field in said core, and a plurality of angularly spaced secondary coils on said core connected together.

4. A system for multiplying frequency comprising, in combination, a primary source of polyphase current, a saturated closed magnetic core having a polyphase winding thereon connected to said source, and a plurality of angularly spaced secondary coils on said core, said secondary coils being connected together.

5. A system for multiplying frequency, comprising in combination a stationary saturated closed magnetic core having a multiphase primary winding thereon capable when excited of producing a rotating field in said core, and a plurality of angularly spaced secondary coils on said core connected together, said secondary coils having equal phase differences.

6. A system for multiplying frequency, comprising in combination a primary source of polyphase current, a saturated closed magnetic core having a polyphase winding thereon connected to said source, and a plurality of angularly spaced secondary coils on said core, said secondary coils being connected together, said secondaries having equal phase differences.

ISAAC SHOENBERG.